United States Patent
Coffey et al.

[15] 3,707,653
[45] Dec. 26, 1972

[54] FRONT COVER ASSEMBLY FOR ELECTRICAL PANELS

[72] Inventors: William F. Coffey, Stratford; Kenneth R. Coley, Fairfield, both of Conn.

[73] Assignee: Westinghouse Electric Corporation, Pittsburgh, Pa.

[22] Filed: Feb. 28, 1972

[21] Appl. No.: 229,994

[52] U.S. Cl. .....................317/120, 317/106, 174/66
[51] Int. Cl. ...........................H02b 1/04, H02b 9/00
[58] Field of Search.49/463, 465; 312/257 S, 257 M; 52/521, 588; 174/66; 317/104–106, 111, 112, 120

[56] References Cited

UNITED STATES PATENTS

| 3,247,337 | 4/1966 | Wiegel | 317/108 |
| 2,650,331 | 8/1953 | Clark | 317/120 |
| 3,479,104 | 11/1969 | Kobryner | 317/107 |

Primary Examiner—Robert K. Schaefer
Assistant Examiner—Gerald P. Tolin
Attorney—A. T. Stratton et al.

[57] ABSTRACT

A front cover assembly for electrical panels has detachable cover sections including mating sides fastened together so as to form an integral unit covering separate compartments of the panel and for removal of one cover section to open a panel compartment while another compartment remains closed by the cover assembly.

6 Claims, 5 Drawing Figures

FRONT COVER ASSEMBLY FOR ELECTRICAL PANELS

CROSS-REFERENCE TO RELATED APPLICATION

This is related to our patent application, Ser. No. 229990, filed on 2-28-72 for a Bus Bar Interconnection Arrangement For Stackable Electrical Panels.

BACKGROUND OF THE INVENTION

This invention relates to a front cover assembly for electrical panels and more particularly to an improved front cover assembly which includes detachable sections for enclosing separate compartments of an electrical panel.

Electrical panels installed at power distribution centers include enclosures for housing the various components used for switching, metering, bus bar and branch circuit interconnections, and overload and fault protection. Often components of different types are mounted in ganged arrangements in separate compartments of a common electrical panel. In the metering panelboard or multimeter center type of electrical panel, to which the present invention particularly pertains, the meter compartment and a circuit breaker compartment are often combined in a single enclosure. A group of watthour meters are supported within the associated compartment such that when the front cover is installed the glass meter covers are exposed through the cover and sealed thereto during the initial phases of installation. Since servicing and installation of wiring is often required periodically within the breaker compartment, the meter compartment is isolated from within the enclosure to prevent unauthorized access to the meters and meter connections. Accordingly, the front cover of the meter center must include a cover section for fixed mounting over the meter compartment and a cover section for mounting over the breaker compartment to complete the closing of the front of the panel and to permit opening of the breaker compartment while the meter compartment remains closed.

In some prior panel arrangements a strap is provided at the front and along a partition between the separate compartments so as to require separate mounting of each cover between the front strap and the side walls of the panel enclosure. Often each of the cover sections for a meter or a breaker compartment are also made up in separate subsections with each subsection being associated with an individual meter or breaker unit. The end subsections of these sections, for example, are usually made different from the middle subsections so as to require additional difficulty in manufacture and stocking of different types of cover parts. It is apparent that mounting and installation of the multipart covers can involve time consuming and expensive operations in the field. Also, the separate subsections of a cover section for the meter compartment are often required because the ganged meter sockets supported in the compartment are not individually accessible for servicing or removal through the associated meter opening. Accordingly, in such arrangements, it is usually not feasible to use a single cover section with several meter openings.

SUMMARY OF THE INVENTION

In accordance with this invention a front cover assembly for electrical panels includes separate cover sections for each compartment thereof in which the cover sections have mating sides extending forward and rearward respectively, for overlapped detachable fastening. A mating side of one cover section is formed by a recessed channel having a U-shaped cross section so as to be defined by the outer channel wall which extends forward. The complementary mating side of another cover section is bent rearward from the face thereof a distance substantially equal to the depth of the channel for mutually overlapping engagement of the mating sides within the channel. Removable screw fasteners secure the mating side together for detaching one of the cover sections and removal thereof from the panel while the other cover section remains in place.

It is an important feature of this invention that the cover sections are detachably fastened together for installation as an integral front cover assembly. Another feature of the front cover assembly is for use on multimeter center panels such that a first cover section is provided for covering a meter compartment and a second cover section is provided for covering a circuit breaker compartment so that the second cover section is quickly and easily detachable from the first cover section to open the circuit breaker compartment while the meter compartment remains covered by the first cover section. A still further feature of the invention is to provide a front cover assembly having several meter openings in a single cover section and to further provide meter socket bases complementary to the meter openings for removal of a meter socket base through one of the openings for servicing without requiring removal of the cover section after installation. These and other advantages will become apparent from the description of a preferred embodiment shown in the drawings.

DESCRIPTION OF THE PREFERRED EMBODIMENT

Figures 1, 2:
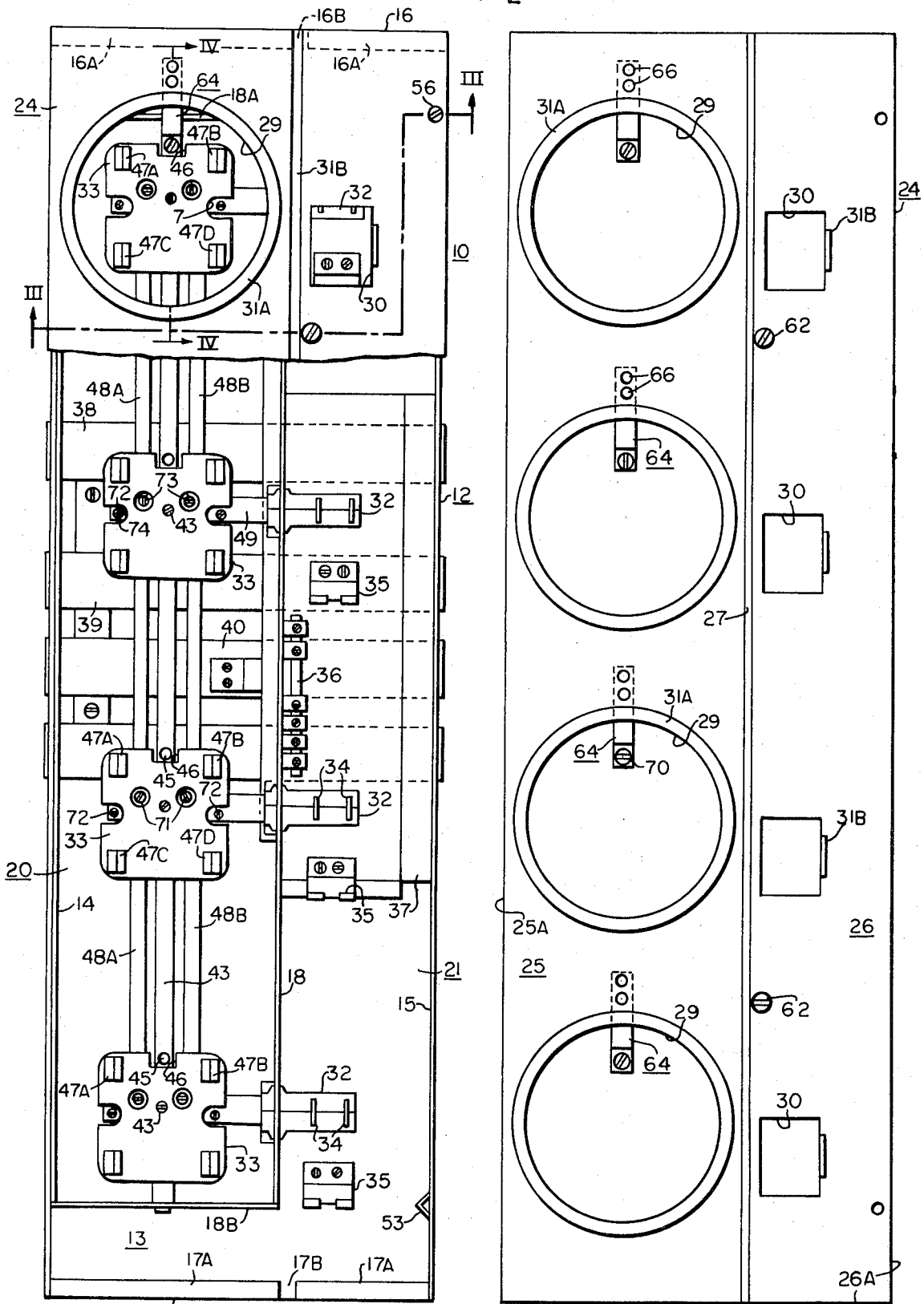
FIG. 1 is a front plan view of an electrical panel having a front cover assembly partially shown which is made in accordance with this invention.
FIG. 2 is a complete front plan view of the front cover assembly partially shown in FIG. 1.

Referring now the drawings and more particularly to FIG. 1 there is shown an electrical panel 10 of a type utilized for a multimeter center. The panel 10 is adapted for stacked mounting and electrical interconnection with like or similar stackable panels and described in the above-identified application Ser. No. 229990.

The panel 10 includes a box-like sheet metal enclosure 12 having a rear wall 13, side walls 14 and 15 and top and bottom end walls 16 and 17. These walls 14, 15, 16 and 17 extend forward from the rear wall 13 and terminate at associated front edges 14A, 15A, 16A and 17A, illustrated in FIGS. 3 and 5, defining a rectangular front opening extending substantially in a single plane. A partition 18 also extends forward from the rear wall 13 and terminates at a front edge 18A also substantially coplanar with the front edges 14A, 15A, 16A and 17A. The central part of the partition 18 is parallel to the side walls, 15 and 14 and therefore normally vertical, and the top and bottom ends of the partition 18 are parallel and spaced from the top and bottom end walls 16 and 17, and therefore normally horizontal, to connect the partition 18 to the side wall 14. This defines a meter compartment 20 and also a combined wiring gutter and circuit breaker compartment 21, hereinafter referred to as the breaker compartment. Within the enclosure 12 the meter compartment 20 is completely separated from the breaker compartment 21 which has a generally reversed C-shaped frontal configuration extending to one side and above and below the meter compartment 20.

Figure 3:
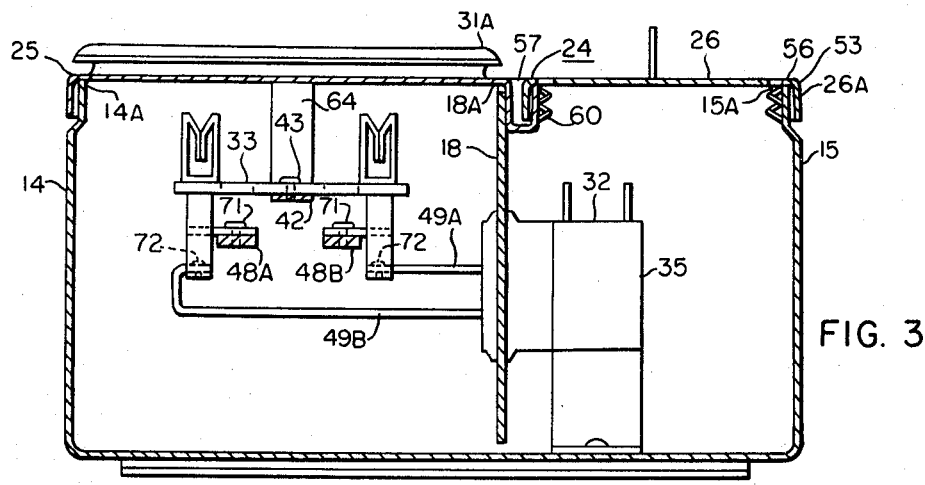
FIG. 3 is a cross-sectional view taken along the axis III—III of FIG. 1 and looking in the direction of the arrows.
Figure 5:
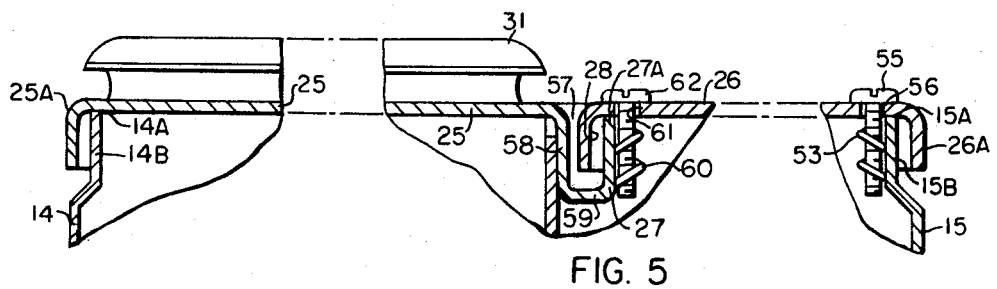
FIG. 5 is an enlarged fragmentary view of FIG. 3.

A front cover assembly 24 shown in FIG. 2 and forming a principal feature of this invention, encloses the front opening of the enclosure 12 by extending in a flat plane over the front edges 14A, 15A, 16A and 17A described hereinafter. A meter cover section 25 and a breaker cover section 26 both having flat coplanar faces form the detachable sections of the assembly 24. As shown in FIGS. 3 and 5, the outer sides 25A and 26A of the cover sections 25 and 26, respectively, are inturned to overlap recessed forward side portions 14B and 15B of side walls 14 and 15, respectively. Downturned and upturned lip surfaces define the top and bottom front edges 16A and 17A so the top and bottom portions of the faces of the cover sections 25 and 26 overlap these front edges. The inner and mating sides 27 and 28 of the cover sections 25 and 26, respectively, are located for positioning parallel and adjacent to the central and normally vertical portions of the partition 18. A series of circular meter openings 29 and rectangular circuit breaker openings 30 are provided in the cover sections 25 and 26, respectively. These openings 29 and 20 are positioned for alignment with meter and circuit breaker mounting parts described hereinbelow. The meter openings 29 include sealing rims 31A projecting forward and lock receiving tabs 31B project forward adjacent the breaker openings 30. The cover sections 25 and 26 are made of a bendable steel sheet metal material similar to that used for the material comprising the enclosure 12.

Before describing the front cover assembly 24 in full detail, the enclosure 12 is described for a better appreciation of the operative relationships between the front cover assembly 24 and the components and design of the panel 10. The enclosure 12 is illustrated vertically in FIG. 1 as it is intended to be used for horizontally stack mounting with complementary enclosures as described in the aforementioned application Ser. No. 229990. A vertically ganged mounting arrangement is provided for circuit breaker receptacles 32 and meter socket bases 33 in the compartments 21 and 20, respectively. Four meter socket bases 33 and four associated circuit breaker receptacles 32 are illustrated as a representative embodiment for receiving four watthour meters, not shown, in the meter compartment 20 and four circuits, also not shown, in the breaker compartment 21. For example, the panel 10 has been successfully made including the front cover assembly of this invention for two, three, five and six meters.

Within the breaker compartment 21, each breaker receptacle 32 includes a pair of bayonet terminals 34 receivable into mating female terminals of a circuit breaker not shown. Each receptacle 32 is supported along the left side, as viewed in FIG. 1, by vertical slots receiving the edges of an opening in the central part of the partition 18. A support bracket 35 is mounted below each receptacle 32 on the rear wall 13 to support the bottom of the associated circuit breaker. A neutral wire terminal strip 36 is also mounted in the compartment 21. Wire conductors, not shown, are fed through the top and bottom end walls 16 and 17 for connection to the circuit breakers to be mounted on the receptacles 32 and the terminal strip 36. These wire conductors are associated with each of four branch circuits distributed by the panel 10. A barrier 37 separates the forward portion of the breaker compartment 21 from four horizontally extending polyphase main bus bars 38, 38, 40 and 41 carried on insulators, not shown, attached to the rear wall 13. The barrier 37 is described more fully in the aforementioned application Ser. No. 229990.

The meter socket bases 33 are supported by an elongated meter socket support bar 42 extending vertically between the horizontal top and bottom ends of the partition 18 and are fastened thereto. Screws 43 applied through the face of each meter socket base 33 are threaded to a first series of holes 44 of the support bar 42, as shown in detail in FIG. 4. A second series of holes 45, preferably threaded, in the support bar 42 are located within the areas of wide slots 46 provided in the top edge of each of the meter socket bases 33. This is for attaching the meter cover section 25 as described hereinbelow.

The meter socket bases 33 are intended to receive a single phase type of watthour meter at jaw terminals 47A, B, C and D. One pair of jaw terminals 47A and 47B are connected to a pair of small bus bars 48A and 48B, respectively, which in turn are connected to two of the main bus bars 38, 39, 40 and 41. The other pairs of jaw terminals 47C and 47D are connected by a pair of conductive links 49A and 49B to the associated circuit breaker receptacle 32 as shown in FIG. 3. It is an important feature of this invention that the peripheral edges around the faces of the meter socket bases 33 are each wholly within the area circumscribed by one of the meter openings 29.

Referring now in particular detail to the front cover assembly 24, the outer sides 25A and 26A of the cover sections 25 and 26 are inturned so as to overlap inwardly recessed forward side portions 14B and 15B, of the side walls 14 and 15, respectively, as noted hereinabove. This aligns the outer side surfaces of the cover outer sides 25A and 26A in substantially coplanar relationship with the outer surfaces of the sidewalls 14 and 15. Top and bottom portions of the cover sections 25 and 26 are flat continuations of the faces thereof so as to make flat overlapping engagements with the vertically extending top and bottom front edges 16A and 17A extending substantially perpendicular to the top and bottom end walls 16 and 17. The lips forming front edges 16A and 17A include gap spaces 16B and 17B vertically aligned with each other so that the left edges thereof are aligned with the vertical part of the partition 18.

As shown in FIGS. 3 and 5 screw lances 53 are formed by a die punching operation along the recessed forward portion 15B of the side wall 15. These screw lances are well known and include integral protruding strips angled and having a width for accommodating the helical spaces between the threads of a quick connect type of screw 55. An opening for receiving screws 55 in interlocking relationship is thus provided by the screw lances 53. The screws 55 are applied through clearance holes 56 provided in the face of the cover section 26 so as to be centered with the screw lances 53 when the cover section 26 is in place on the front of the enclosure 12. Accordingly, the screws 55 clamp the back surfaces of the face of the cover section 26 to the front edge 15A of the sidewall 15. The outer inturned cover side 26A provides a positive closing of the front edge 15A to prohibit access to the interior of the enclosure 12 from across this front edge.

The mating sides 27 and 28 of the cover section 25 and 26 extend forward and rearward, respectively, relative to the face of the associated cover section 25, 26. The mating side 28 of the cover section 26 is formed substantially the same as is the outer inturned side 26A thereof so as to extend substantially perpendicular and inturned from the face of the cover section 26 and therefore parallel to the outer inturned side 26A. The mating side 27 of the cover section 25 is defined by an outer channel wall of a generally U-shaped channel 57 recessed rearward into the face of the cover section 25. The U-shaped cross-sectional configuration of the channel 57 further defines an inner channel wall 58 inturned immediately adjacent the face of the cover section 25. This inner channel wall 58 is formed by bending a side portion of the cover section 25 at a right angle to the face thereof and rearward so as to overlap and be in mutually flat engagement with the side surface of the vertical part of the partition 18 adjacent the compartment 21. The bottom 59 of the U-shaped cross section of the channel 56 extends laterally at right angles between the inner and outer channel walls.

The outer channel wall defining the mating side 27 extends forward from the channel bottom 59 and terminates at a front edge 27A thereof. This front edge 27A is substantially coplanar with the back surfaces of the faces of the cover sections 25 and 26 so as to be offset rearwardly from the faces thereof substantially the thickness of the sheet metal material of the cover sections. Accordingly, the back surface of the face of the cover section 26 rests on the front edge 27A of the side 27 so that the faces of the cover sections are aligned in coplanar relationship. Since the inturned mating side 28 extends within the channel 57 and overlaps the surface of mating side 27, the front edge 27A is sealed to prevent access thereacross into the interior of the breaker compartment 21. Also, as shown in FIG. 3, the inner channel wall 58 covers the front edge 18A of the partition 18 to prevent access thereacross and into the meter compartment 20. At the top and bottom of the enclosure 12, the back surface of the U-shaped channel 56 is inserted in the gaps 16B and 17B of the top and bottom edges 16A and 17A in a close fitting relationship.

For detachably fastening the mating sides 27 and 28 of the cover sections 25 and 26, screw lances 60, shown more clearly in FIG. 5, are die punched laterally outward in the mating side 27, to be oriented under the face of the cover section 26. The lance projections form screw receiving holes extending rearward. A hole 61 is provided in the face of the cover section 26 adjacent the bend forming the mating side 28 thereof and in alignment with the screw lance 60. A quick connect screw 62 similar to the screw 55 is applied through each hole 61 and is threaded in interlocking relationship to each screw lance 60.

Figure 4:
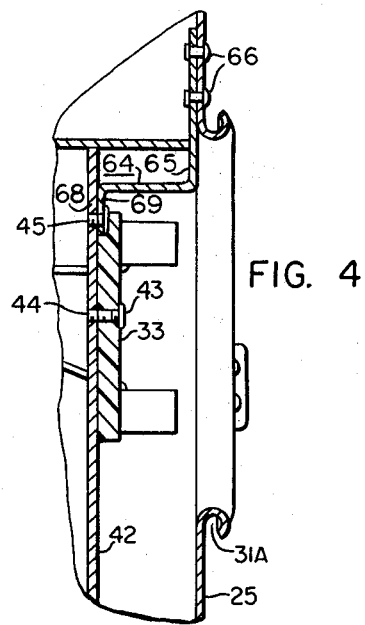
FIG. 4 is a fragmentary cross-sectional view taken along the axis IV—IV of FIG. 1 and looking in the direction of the arrows.

For completing the removable fastening of the front cover assembly 24 to the enclosure 12, the cover section 25 includes identical brackets 64 depending vertically downward and rearward from the back surface of the face of the cover section 25. The side configuration of the brackets 64 is shown in FIG. 4. An upper bracket end 65 of the bracket 64 is fastened to the face of the cover section 25 by rivets 66 above the center of each meter opening 29, and extends vertically downward across the edges of the meter openings 29. The center portion 67 of the bracket 64 extends rearward at substantially a right angle to the end 65 to off-set a lower bracket end 68 extending substantially parallel and vertically downward relative to the upper bracket end 65. The lower bracket end 68 is arranged to make flat engagement with the top of the support bar 42 and fit within the slot 46 noted hereinabove in each meter socket base 33. A hole 69 is provided in the bracket end 68 for alignment with the threaded hole 45 in the support bar 42. A screw 70 is applied through the hole 69 and is threaded to the hole 45 to fasten the bracket 64 and thus the cover section 25 to the bar 43 and the enclosure 12. The slots 46 expose the screws 70 through the meter openings 29 for easy access during installation of the front cover assembly 24 to the enclosure 12 as described hereinafter.

The front cover assembly 24 is typically installed as an integral unit to the front of the enclosure 12 with the cover sections 25 and 26 fastened together along the channel 56 by the screws 62. The inturned outer sides 25A and 26A slide over the recessed forward side portions 14B and 15B of the sidewalls 14 and 15. The back surface of the channel fits into the gap spaces 16B and 17B of the top and bottom front edges 16A and 17A. As the front cover assembly 24 is forced against the front edges of the enclosure 12, each of the front edges 14A, 15A, 16A and 17A is sealed by the above-described overlapping relationship between the inturned cover sides 25A and 26A and the sidewalls 14 and 15 and between the top and bottom portions of the faces of the cover portions adjacent the top and bottom front edges 16A and 17A.

The meter openings 29 and circuit breaker openings 30 are thereby operatively positioned with respect to the related components of the meter compartment 20 and breaker compartment 21. The screws 70 are applied to secure the brackets 64 to the support bar 42. Also, the screws 55 are applied through the holes 56 of the cover section 26 and to the screw lances 53 to complete the initial installation of the front cover assembly 24 to the enclosure 12.

Watthour meters, not shown, are installed through the meter openings 29 and mounted to the jaw terminals 45A, 45B, 45C and 45D of the meter socket bases 33. The meters are sealed to the sealing rims 31A of the meter openings 29 in a conventional manner understood by those skilled in the art. An important feature of the cover sections 25 is the relationship with the meter socket bases 33. If service of one of the meter socket bases 33 is required, the meter socket base 33 is disconnectable from the bus bars 48A and 48B and the conductive links 49A and 49B by removal of screws 71 and 72, shown in FIG. 3 which are accessible through hole and slot openings 73 and 74 in the meter socket bases 33, as shown in FIG. 1. A meter socket base 33 is then removable through the meter opening 29 upon removal of the screw 44. Accordingly, the cover section 25 does not need removal for service of a meter socket base 33.

The cover section 26 is removed for access to the breaker compartment 21 by removal of the screws 55 and 62 from the face of the cover section 26. The opposite inturned sides 25A and 28 slide off of the recessed forward side portion 15B and the mating side 27 of the cover section 25 to expose the breaker compartment 21. This often is necessary to service the circuit breaker receptacles 32, the associated circuit breakers or to place and connect external wire conductors within the breaker compartment 21.

It is noted that the meter compartment 20 is maintained separate from the breaker compartment 21 with the cover section 21 removed since the inner channel wall 57 of the channel 56 overlaps the front edge 18A of the partition 18 as it engages the back surface of the face of the cover section 26. Also, the cover section 25 is independently held in place on the front of the enclosure 12 by the brackets 64 being secured by the screws 70 to the support bar 42 within the meter compartment 20. It is noted that the screws 70 are concealed after watthour meters are mounted on the meter socket bases 33 and therefore make it impossible for unauthorized removal of the cover section 25 since the meters are normally sealed to the meter opening rims 31. The cover section 26 is simply replaced by aligning and assembling the sides 26A and 28 thereof with the complementary enclosure side portion 15B and the mating cover side 27, respectively, and applying the screws 55 and 62 to the integral screw lances 53 and 60, respectively.

It is readily apparent to those skilled in the art that the front cover assembly for electrical panels of this invention may be modified without departing from the spirit and scope of the invention.

We claim as our invention:

1. In an electrical panel including an enclosure with front edges defining a front opening and wherein said enclosure has separate compartment areas exposed through said front opening, a front cover assembly for closing said front opening, said assembly comprising:

first and second cover sections each closing a separate one of said compartment areas;

said first and second cover sections having mutually engaging side surfaces detachably connecting the cover sections together;

one of said side surfaces extending rearward from the face of said second cover section so as to terminate at an inturned edge directed toward said enclosure;

the other of said side surfaces being formed by a channel recessed into the face of said first cover section such that said other side surface terminates at a front edge directed away from said enclosure, said channel receiving said one side surface so that the face of said second cover section covers said front edge of said other side surface;

and removable fastener means securing said first and second cover sections together along said side surfaces such that said second cover section is detachable from said first cover section so as to open the compartment area closed by the second cover section.

2. The electrical panel of claim 1 wherein said enclosure includes a partition separating said compartment areas and said recessed channel of said first cover section extends parallel and adjacent to said partition so as to maintain the front edge of said partition covered when said second cover section is detached from said first cover section.

3. The electrical panel of claim 2 wherein said panel is a multimeter center with one of the compartments having supported therein plural watthour meter socket bases and being closed by said first cover section and with another of the compartments including circuit breaker receptacles and being closed by said second cover section.

4. The electrical panel of claim 3 wherein said first cover section includes plural openings for receiving watthour meter devices mountable on said meter socket bases.

5. The electrical panel of claim 2 wherein said side surface of said first cover section includes integral laterally outward extending projections defining a screw lance for receiving a screw, said second cover section includes a hole aligned with each screw lance, and said removable fastener means includes a screw received by the last named hole and aligned screw lance to clamp said first and second cover sections together.

6. The electrical panel of claim 4 wherein plural bracket members are fixedly attached at one end to said first cover section so that the other end extends rearwardly thereof and is exposed through the face of said first cover section by one of the meter openings, and a screw removably fastening said other end of said bracket to said enclosure within said one compartment such that said first cover section is secured to said enclosure independently of said second cover section.

* * * * *